United States Patent
Colignon

(10) Patent No.: US 7,603,851 B2
(45) Date of Patent: Oct. 20, 2009

(54) SYSTEM FOR ASSISTING IN THE REGENERATION OF MOTOR VEHICLE DEPOLLUTION MEANS

(75) Inventor: Christophe Colignon, Levallois Perret (FR)

(73) Assignee: Peugeot Citroen Automobiles SA, Velizy Villacoublay (FR)

( * ) Notice: Subject to any disclaimer, the term of this patent is extended or adjusted under 35 U.S.C. 154(b) by 464 days.

(21) Appl. No.: 10/595,634

(22) PCT Filed: Oct. 12, 2004

(86) PCT No.: PCT/FR2004/002589

§ 371 (c)(1),
(2), (4) Date: May 1, 2006

(87) PCT Pub. No.: WO2005/047677

PCT Pub. Date: May 26, 2005

(65) Prior Publication Data

US 2008/0190098 A1    Aug. 14, 2008

(30) Foreign Application Priority Data

Nov. 7, 2003   (FR)   ................... 03 13162

(51) Int. Cl.
*F01N 3/00*   (2006.01)

(52) U.S. Cl. .............. 60/295; 60/286; 60/297; 60/303

(58) Field of Classification Search ............. 60/277, 60/280, 286, 295, 297, 303
See application file for complete search history.

(56) References Cited

U.S. PATENT DOCUMENTS

| | | | |
|---|---|---|---|
| 4,655,037 A * | 4/1987 | Rao | 60/295 |
| 6,622,480 B2 * | 9/2003 | Tashiro et al. | 60/311 |
| 6,851,258 B2 * | 2/2005 | Kawashima et al. | 60/295 |
| 6,948,311 B2 * | 9/2005 | Schaller et al. | 60/286 |
| 6,952,919 B2 * | 10/2005 | Otake et al. | 60/297 |
| 7,231,761 B2 * | 6/2007 | Okugawa et al. | 60/295 |
| 7,340,886 B2 * | 3/2008 | Kawashima et al. | 60/295 |

FOREIGN PATENT DOCUMENTS

| | | |
|---|---|---|
| DE | 19932290 A | 1/2001 |
| DE | 10033159 A | 1/2002 |
| EP | 1281852 A | 2/2003 |
| FR | 2804168 A | 7/2001 |

OTHER PUBLICATIONS

International Search Report dated Feb. 17, 2005.

* cited by examiner

*Primary Examiner*—Tu M Nguyen
(74) *Attorney, Agent, or Firm*—Nicolas E. Seckel

(57) ABSTRACT

This system in which the engine implements regeneration strategies at a first level and at a second level depending on different engine operation control parameters in order to obtain different temperature levels in the exhaust line involves acquiring the exothermic temperature level of the catalyst, comparing it with a threshold value so that in the event of the threshold being exceeded while the second level strategy is being applied, the system is controlled to regulate one of the engine operation control parameters in order to reduce the exothermic temperature level, and if this temperature level does not drop back below the threshold value at the end of a first time period, the system is controlled to switch over to the first level strategy, and if this exothermic temperature level still does not drop below the threshold value at the end of a second time period, to stop the regeneration strategy.

11 Claims, 1 Drawing Sheet

SYSTEM FOR ASSISTING IN THE REGENERATION OF MOTOR VEHICLE DEPOLLUTION MEANS

Figure 1:
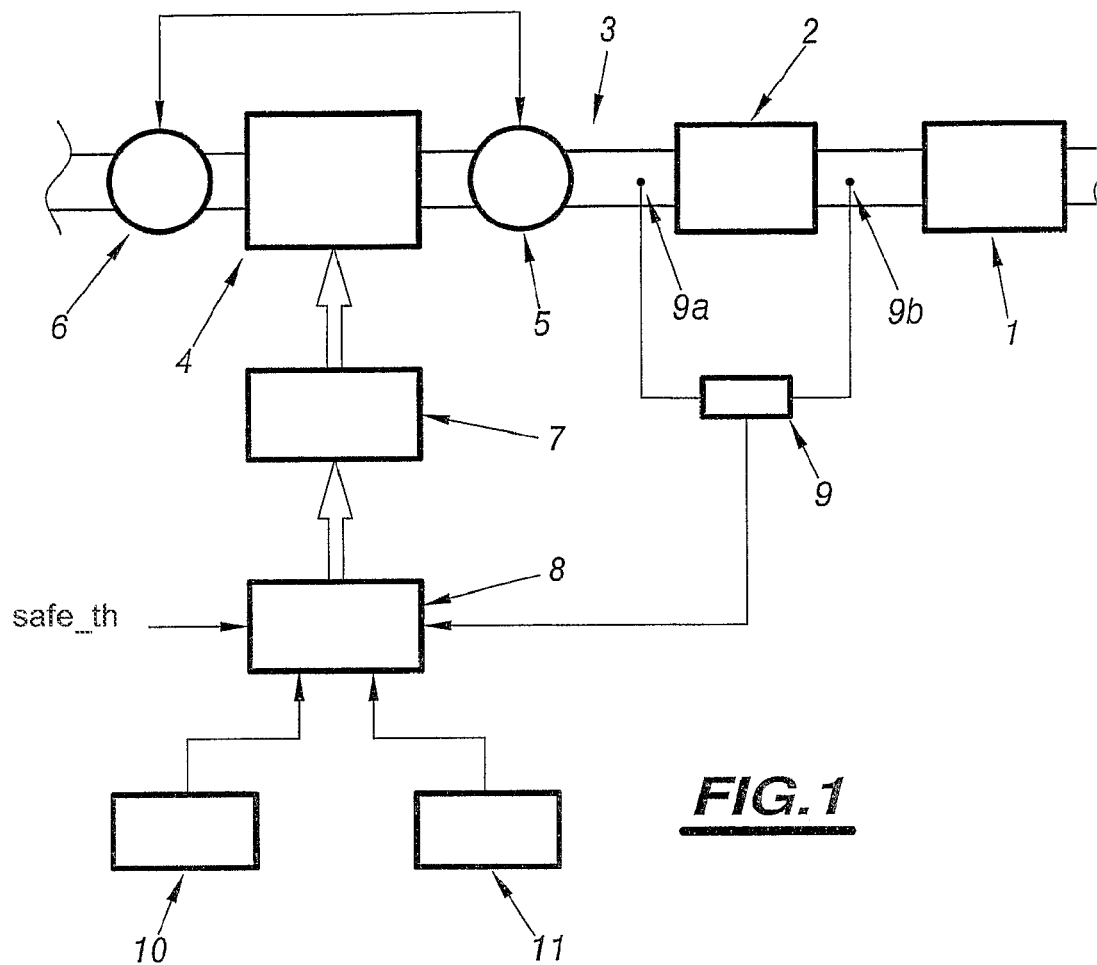

The present invention relates to a system for assisting the regeneration of depollution means associated with oxidation catalyst-forming means and integrated in an exhaust line of a motor vehicle diesel engine.

More particularly, the invention relates to such a system in which the engine is associated with common manifold or "rail" feed means for injecting fuel into the cylinders of the engine, including at least one post-injection of fuel, and adapted at constant torque to implement at least two regeneration strategies, at a first level and at a second level, depending on different engine operation control parameters in order to obtain different temperatures levels in the exhaust line, with the temperature level that corresponds to the second level strategy being higher than that which corresponds to the first level strategy.

During regeneration of depollution means, such as a particle filter, an oxidation catalyst after being poisoned by sulfur, a NOx trap for sulfate purging, or a SOx trap, it is necessary to raise the temperature of the engine exhaust gas strongly in order to obtain regeneration that is rapid and also in order to minimize the excess consumption of fuel associated with such regeneration.

This requires the temperature at the inlet to the catalyst-forming means to be raised very considerably.

Certain strategies also rely on using catalyst-forming means to convert unburned hydrocarbons coming from combustion in the engine, in order to further raise the temperature level in the exhaust line.

However, catalytic reactions that are excessively exothermic can lead to the catalyst-forming means breaking in the worst of cases or to said means aging prematurely, and thus leading to premature degradation of their conversion performance.

It is therefore necessary to control thoroughly the exothermic nature of the catalytic reaction that takes place during regeneration.

The object of the invention is thus to solve these problems.

To this end, the invention provides a system for assisting the regeneration of depollution means associated with oxidation catalyst-forming means, and integrated in an exhaust line of a motor vehicle diesel engine, in which the engine is associated with common rail feed means for injecting fuel into the cylinders of the engine, including at least one post-injection, and adapted, at constant torque, to implement at least two regeneration strategies at a first level and at a second level, depending on different engine operation control parameters in order to obtain different temperature levels in the exhaust line, the temperature level corresponding to the second level strategy being higher than that corresponding to the first level strategy, the system being characterized in that it includes acquisition means for acquiring the exothermic temperature level of the catalyst-forming means, comparator means for comparing this exothermic temperature level with a safety threshold for the catalyst-forming means, so that in the event of said threshold value being exceeded while applying the second level strategy, the feed means are controlled to regulate progressively at least one of the engine operation control parameters in such a manner as to reduce the exothermic temperature level of the catalyst-forming means, and if this level does not drop below the threshold value at the end of a first predetermined time period, to control the feed means to switch over to the first level strategy, and if said exothermic temperature level of the catalyst-forming means still does not drop below the safety threshold value at the end of a second period of time, to stop the regeneration strategy;

in that the feed means are adapted to implement two successive post-injections;

in that during regulation, the feed means are adapted to reduce progressively the flow rate of fuel in the second post-injection, and in that the feed means are adapted to reduce the flow rate of the second post-injection by using a correction factor lying in the range 0 to 1 and determined on the basis of the difference between the exothermic temperature level and the safety threshold value.

According to other characteristics:

the correction factor is determined by a proportional integral (PI) type regulator having non-linear gain;

the acquisition means for acquiring the exothermic temperature comprise two temperature sensors, one placed upstream and the other placed downstream from the catalyst-forming means;

the engine is a diesel engine associated with a turbocharger;

the value of the safety threshold is calibratable;

the depollution means comprise a particle filter;

the depollution means comprise a NOx trap;

the depollution means comprise a SOx trap;

the depollution means comprise an oxidation catalyst;

the fuel includes an additive for being deposited together with the particles of which it is mixed on the depollution means in order to facilitate regeneration thereof; and the fuel includes an additive forming a NOx trap.

Figure 2:
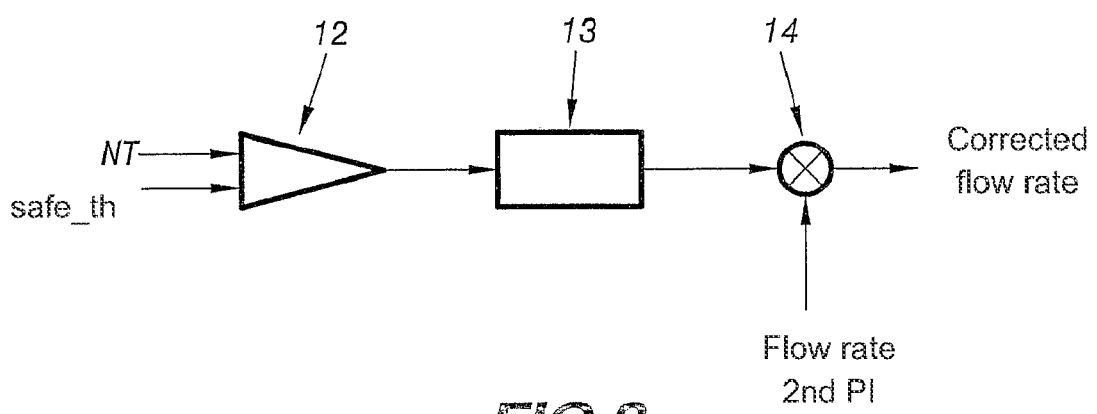

The invention can be better understood on reading the following description given purely by way of example and made with reference to the accompanying drawings, in which:

FIG. 1 is a block diagram showing the structure of a system according to the invention for providing assistance for regeneration; and FIG. 2 shows the operation of pilot means included in the structure of such a system for providing assistance in regeneration.

FIG. 1 shows a system for providing assistance in regenerating depollution means and given overall reference 1, the system is associated with oxidation catalyst-forming means, given overall reference 2, that are integrated in an exhaust line, given overall reference 3, of a motor vehicle diesel engine 4.

The catalyst-forming means are placed upstream from the depollution means.

The engine may be associated with a turbocharger having its turbine portion 5 disposed in the exhaust line and its compressor 6 disposed upstream from the engine.

By way of example, the depollution means may comprise a particle filter, a NOx trap, an oxidation catalyst, a SOx trap, etc.

It should also be observed that in conventional manner the fuel may include an additive that is to be deposited together with the particles with which it is mixed on the depollution means in order to facilitate regeneration thereof by lowering the combustion temperature of soot trapped therein.

In conventional manner, the additive is present in the particles after the combustion of the additive-containing fuel in the engine.

It is also possible to envisage using an additive to form a NOx trap.

The engine is also associated with common rail feed means for injecting fuel into the cylinders of the engine, including at least one post-injection of fuel.

These means are given overall reference 7 in the figure and they are associated with pilot means, given overall reference 8, in order, at constant torque, to implement at least two regeneration strategies, at a first level and at a second level, depending on different engine operation control parameters, in order to obtain different temperature levels in the exhaust line, with the temperature level corresponding to the second level being higher than that corresponding to the first level strategy.

This is done by modifying the engine operation control parameters, such as, for example: air admission, by regulating the butterfly valve for admitting air into the engine, by regulating the setpoint pressure for the turbocharger, or by regulating the quantity of fuel injected into the engine, e.g. during the post-injections, in conventional manner.

It is known that such depollution means are regenerated by using multiple injections of fuel into the cylinders of the engine, in particular during their expansion stages.

In order to limit exothermic temperature rise during regeneration, the pilot means continuously monitor the temperature difference across the ends of the catalyst system or of each element of the catalyst system, said difference being representative of the exothermic temperature level, in order to adapt the characteristics of the various injections (flow rate, start of injection, etc. . . . ) so as to reduce the exothermic temperature level of said catalyst-forming means when it becomes too high.

The system includes means for acquiring the exothermic temperature level of the catalyst-forming means, given overall reference 9 in the figure, means for comparing said temperature level with a safety threshold value for the catalyst-forming means, said comparator means being formed by the pilot means 8, and serving in the event of the threshold levels being exceeded while the second level strategy, given overall reference 10, is being applied to control the feed means 7 in such a manner as to regulate progressively at least one of the engine operation control parameters so as to reduce the exothermic temperature level of the catalyst-forming means, and if this level does not drop down to below the threshold value at the end of a first predetermined time period, to control the feed means to switch over to the first level strategy, given overall reference 11, and if the exothermic temperature level of the catalyst-forming means still does not drop below the safety threshold value at the end of a second predetermined period of time, to stop the regeneration strategy.

The means for acquiring the exothermic temperature level of the catalyst-forming means may comprise two temperature sensors 9a, 9b, one placed upstream and the other placed downstream of the catalyst-forming means.

Regulation is represented by FIG. 2 in which there can be seen a comparator given overall reference 12 receiving at its inputs the value of the safety threshold safe_th for the catalyst-forming means and the temperature level TL of the catalyst-forming means, acquired as described above.

The output from the comparator 12 is connected to a PI type regulator having non-linear gain designated by overall reference 13, adapted to deliver correction information to a corrector 14 for progressively reducing the fuel flow rate of a second post-injection in the event that the feed means 7 are adapted to implement two successive post-injections.

It will then be understood that under such circumstances, the feed means 7 are adapted to reduce the flow rate of the second post-injection by using a correction factor lying in the range 0 to 1 and determined on the basis of the difference between the exothermic temperature level TL of the catalyst-forming means and the safety threshold value safe_th.

Naturally, the value of the safety threshold may be calibratable.

It will then be understood that the purpose of this system is to limit the exothermic temperature level produced in the catalyst-forming means 2 in order to preserve the integrity thereof and in order to limit the aging phenomenon that degrades the conversion performance thereof.

These excessive temperature peaks can arise only while the regeneration assistance system is operating at level 2.

By comparing the instantaneously-measured exothermic temperature level with a threshold, it can be determined whether a critical temperature is exceeded or not.

Thereafter, depending on the difference relative to the threshold, the regeneration assistance strategy (flow rates and phase positions of the various injections) is modified in order to reduce this exothermic temperature while still maintaining constant torque, e.g. by reducing the post-injection flow rate.

In the example described, the regeneration strategy makes use of multiple injections and in particular of two post-injections. Calibration can be implemented in such a manner that the quantity of fuel used for the second post-injection modifies the quantity of hydrocarbon (HC) produced, but without having any influence on the torque delivered by the engine.

Thus, by reducing the flow rate of post-injection No. 2, the quantity of HC emitted by the engine is reduced, and consequently the catalytic temperature generated by the unburned hydrocarbons in the catalyst-forming means is also reduced.

The correction to the quantity of post-injected fuel is implemented so long as the exothermic temperature of the catalyst-forming means remains above the safety threshold. If in spite of reducing the quantities of fuel injected, the exothermic temperature does not drop below the threshold at the end of a first time period, then the system is forced to switch over to its level 1 strategy, for use when the catalyst-forming means are not activated and in which practically no HCs are produced.

If, even after switching over to level 1 strategy, the exothermic temperature remains too high for a predetermined period of time, then regeneration is interrupted.

Thus, if the exothermic temperature DTcat produced by the catalyst, measured as the difference between the temperatures downstream and upstream of the catalyst-forming means, exceeds a calibratable threshold DTcat_max, then the flow rate of post-injection No. 2 is reduced progressively by being multiplied by a correction factor Kcat lying in the range 0 to 1, as given by a PI type regulator with non-linear gain as a function of the temperature difference Dexo_cat=DTcat−DTcat_max.

A timer tst is then started as soon as Dexo_cat>0. At the end of a calibratable length of time t_safe_cat, the regeneration assistance system is forced to level 1 for a calibratable minimum length of time t_lev1_cat. If at the end of this length of time t_lev1_cat, the exothermic temperature has not still not dropped below the safety threshold DT_cat_max, then regeneration is stopped.

It can be understood that such a system makes it possible to ensure operating safety of the catalyst-forming means.

Naturally, other embodiments could be envisaged.

For example, the depollution means and the oxidation catalyst-forming means could be integrated in a single element, and in particular on a common substrate.

By way of example, a particle filter including the oxidation function could be envisaged.

Similarly, a NOx trap integrating such an oxidation function could also be envisaged, with or without an additive.

The oxidation function and/or the NOx trap function can be performed, for example, by an additive mixed in the fuel.

Finally, the depollution means may also include an oxidation catalyst or a SOx trap.

The invention claimed is:

1. A system for assisting the regeneration of depollution means associated with oxidation catalyst-forming means, and integrated in an exhaust line of a motor vehicle diesel engine, in which the engine is associated with common rail feed means for injecting fuel into the cylinders of the engine, including at least one post-injection, and adapted, at constant torque, to implement at least two regeneration strategies, at a first level and at a second level, depending on different engine operation control parameters in order to obtain different temperature levels in the exhaust line, the temperature level corresponding to the second level strategy being higher than that corresponding to the first level strategy, the system including acquisition means for acquiring the exothermic temperature level of the catalyst-forming means, comparator means for comparing this exothermic temperature level with a safety threshold for the catalyst-forming means, so that in the event of said threshold value being exceeded while applying the second level strategy, the feed means are controlled to regulate progressively at least one of the engine operation control parameters in such a manner as to reduce the exothermic temperature level of the catalyst-forming means, and if this level does not drop below the threshold value at the end of a first predetermined time period, to control the feed means to switch over to the first level strategy, and if said exothermic temperature level of the catalyst-forming means still does not drop below the safety threshold value at the end of a second period of time, to stop the regeneration strategy; wherein:

the feed means are adapted to implement two successive post-injections;

during regulation, the feed means are adapted to reduce progressively the flow rate of fuel in the second post-injection; and the feed means are adapted to reduce the flow rate of the second post-injection by using a correction factor lying in the range 0 to 1 and determined on the basis of the difference between the exothermic temperature level and the safety threshold value.

2. A system according to claim 1, wherein the correction factor is determined by a PI type regulator having non-linear gain.

3. A system according to claim 1, wherein the acquisition means for acquiring the exothermic temperature comprises two temperature sensors, one placed upstream and the other placed downstream from the catalyst-forming means.

4. A system according to claim 1, wherein the engine is a diesel engine associated with a turbocharger.

5. A system according to claim 1, wherein the value of the safety threshold is calibratable.

6. A system according to claim 1, wherein the depollution means comprises a particle filter.

7. A system according to claim 1, wherein the depollution means comprises a NOx trap.

8. A system according to claim 1, wherein the depollution means comprises a SOx trap.

9. A system according to claim 1, wherein the depollution means comprises an oxidation catalyst.

10. A system according to claim 1, wherein the fuel includes an additive for being deposited together with the particles of which it is mixed on the depollution means in order to facilitate regeneration thereof.

11. A system according to claim 1, wherein the fuel includes an additive forming a NOx trap.

* * * * *